United States Patent Office 3,332,147
Patented July 25, 1967

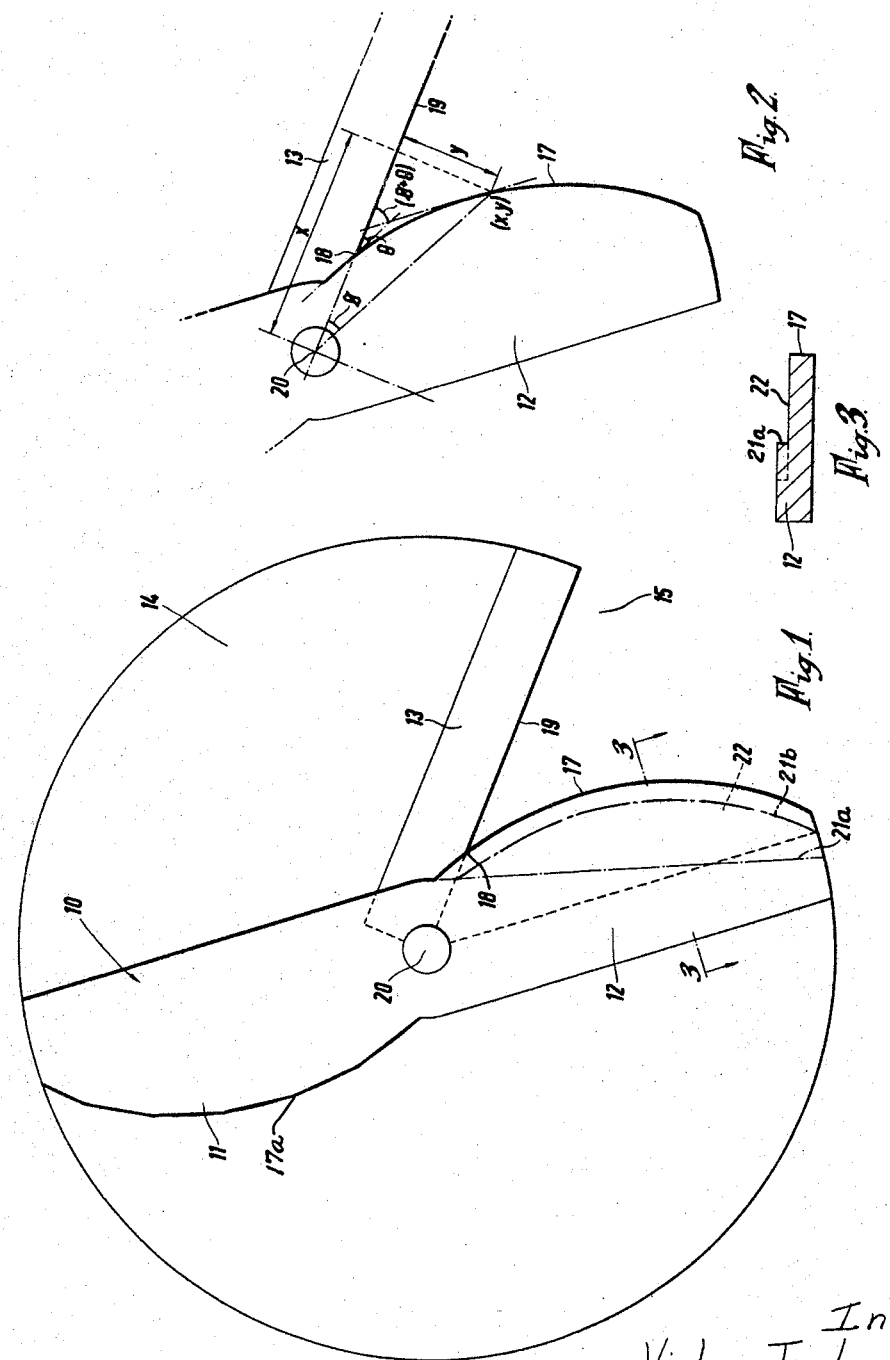

3,332,147
CUTTING MACHINES
Victor Taylor Legge, 3 Blandford Road,
St. Albans, Hertfordshire, England
Filed Aug. 24, 1964, Ser. No. 391,454
10 Claims. (Cl. 30—240)

This invention relates to grass and like cutting machines and in particular to lawn edge trimming devices which operate either as a self-contained unit or as an auxiliary cutting device. Although the invention is particularly applicable to lawn edge trimming machines, it may also be used on other forms of trimming devices, such as hedge cutting machines.

One of the difficulties in operating a lawn edge trimming device is the impossibility of maintaining a satisfactory edge with a vertical face of substantial depth. Between cuts the edge is frequently damaged by being broken away, while the adjacent area, particularly when this consists of soil, builds up against the edge to reduce the cutting depth available to the trimming device. The operation of a trimming device in such conditions means that the cutter blades frequently dig in or engage the soil of the lawn edge and/or the soil of the adjacent area. As a result the cutter blades constantly encounter obstacles, such as stones, which thereby impair the cutting efficiency of the blades and frequently cause damage to them.

The main object of the invention is to avoid this difficulty by designing the rotating and/or the stationary cutting blades to provide a stone rejection section.

In its broadest aspect the invention provides a trimming device, more particularly for a grass cutting machine, said device including a cutter assembly comprising at least one pair of blades which are movable relatively to each other, characterised by the fact that when the said blades cross during a cutting operation the configuration of one or both of said blades is such that the angle between the first crossing edges increases along the length of the blades away from the axis of rotation of the cutter assembly so as to provide a stone rejecting section between the end portions of the cutting edges of the blades.

In the preferred embodiment of the invention the cutter assembly is formed with a stationary blade and one or more rotating blades movable relatively thereto. Preferably, the stationary blade is formed with a straight cutting edge which co-operates with a cutting edge on each of the rotating blades the relative angular position of which increases in a direction away from the cutting edge of the stationary blade at the outer end portions of the blades. The cutting edge of each of the rotating blades may be formed as a plurality of straight edge portions located at an angle one to the other, but in the preferred embodiment the cutting edge of each of the rotating blades is formed as a curve. The arrangement is such that the provisions of such a curved surface will provide a grass cutting angle where the blades cross which is of the order of 20 to 40 degrees, but due to the curved cutting edge of the rotating blade this angle progressively increases towards the outer ends of the blades so that a stone rejecting portion is provided, for example where the angle is above 40 degrees.

As the rotating blades move relatively to the stationary blade the grass cutting angle is maintained at the point at which the blades cross each other, but due to the curvature of the cutting edge of the rotating blade the outer portions of the cuting edges provide a stone rejecting section in that portion where the angular position is greater than 40 degrees. As a result stones which engage between the cutting edges of the two blades are not gripped by the blades but are rejected by a squeezing action which thereby prevents the stones damaging or otherwise contacting the inner cutting edges of the blades which generally form the cutting portion of the assembly.

Having now generally described the invention, a preferred embodiment will now be described by way of example with reference to the accompanying drawings, in which:

FIGURE 1 is a diagrammatic representation of a cutter assembly for a trimming machine in which the rotating cutter blades are designed in accordance with the invention, FIGURE 2 is a diagrammatic representation of the stationary cutter blade and one of the rotating cutter blades for the purpose of illustrating the mathematical computation of the shape of the cutting edge of the rotating blade, and FIGURE 3 is a section through a modified blade structure taken on the line III—III of FIGURE 1.

Referring now to FIGURE 1 of the drawings there is shown an auxiliary trimming device which is intended for the cutting of a lawn edge. The actual construction of the auxiliary trimming device forms no part of the present invention. In known prior patent specifications the auxiliary trimming device comprises a rotating cutter assembly having two or more rotating blades which are drivably connected with the main driving mechanism of the lawn mower. The rotating blades co-operate with a stationary blade mounted on the casing of the auxiliary trimming device, which casing is movable under the control of the operator to lower the trimming device from an inoperative position to an operative position which may be determined by a fixed stop or by supporting devices carried by the casing of the auxiliary trimming device.

The present invention is concerned with the design and shape of the cutting edges of the blades of the cutter assembly of the auxiliary trimming device. Although the invention is particularly applicable to the cutting edges of the rotating blades it may also be applied to the stationary blade of the cutter assembly. The invention may also be applied to both blades and it will also be understood that the invention is equally applicable to other cutting machines such as hedge trimming devices, and agricultural machines.

The cutter assembly of the auxiliary trimming device is shown diagrammatically in FIGURE 1 and it comprises a rotating assembly 10 which includes a pair of diametrically opposed rotating blades 11 and 12 which are identical in construction. As previously mentioned the rotating assembly 10 is driven from the main drive mechanism of the lawn mower. The rotating blades 11 and 12 co-operate with a fixed ledger blade 13 which is mounted on a plate 14 secured to the casing of the auxiliary trimming device. The plate is formed with a segmental aperture 15 and the stationary cutting blade 13 is secured to the plate 14 at the edge of the aperture 15 in any suitable way so as to provide a conventional ledger blade.

The invention is concerned with the design or shape of the actual cutting blades of the cutter assembly. In the embodiment shown the stationary ledger blade 13 is formed with the conventional straight edge and it is preferred to design the cutting edge of the rotating blades 11 and 12 in order to provide the stone rejecting mechanism of the present invention. It will, however, be understood that the cutting edge of the stationary blade may also be designed to provide the desired curvature as required for the stone rejecting mechanism, while as a further embodiment both blades may be suitably designed. The curvature of the cutting edge 17 of the rotating blade 12 is so designed that where the rotating blade 12 and stationary blade 13 cross, as shown by the reference 18, the angle between the blades is sufficient to cut grass, but due to the curvature of the edge 17 the angle changes at a certain distance along the blade so that the blades 12 and 13 will not grip, or have a reduced tendency to grip stones which are thereby ejected from between the blades as they move relatively to each other. The distance from the point 18 may be of the order of ⅜″ and the curvature of the edge 17 is so designed that as the blade 12 rotates the edge 17 always crosses the straight edge 19 of the fixed blade 13 at approximately the same angle, while at a short distance from the cross-over point 18 outwardly of the centre of rotation 20 the curvature is such that the blades will always reject stones.

It has been determined by experiment that the angle for cutting grass at the point 18 at which the blades 12 and 13 cross is of the order of 20 to 35 degrees and in the preferred embodiment this angle is approximately 30 degrees. At a position about ⅜″ along the cutting edge 17 of the blade 12 from the point 18 the angle between the edge 19 of the fixed blade 13 and the tangent to the cutting edge 17 has increased to approximately 40 degrees which is sufficient to ensure that stones will not be gripped. At an angle of over 40 degrees and preferably at an angle of about 50 degrees any stones which become positioned between the blades 12 and 13 will be squeezed outwardly and so rejected as the blades move relatively to each other.

The mathematical computation of the stone rejecting surface 17 for the rotating blade 12 will now be explained with reference to FIGURE 2 of the drawings which is a diagrammatic representation of the blades 12 and 13.

In the following computation the angle $\theta$ is the grass cutting angle at the point 18 where the cutting edge of the blade 12 crosses the cutting edge 19 of the fixed blade 13, while the angle $\phi$ is the angle which a point $x$–$y$ makes from the centre of rotation 20 of the rotating blade 12 with the cutting edge 19 of the stationary blade 13.

The mathematical computation is believed to be as follows:

(1) $$\frac{y}{x} = \operatorname{Tan} \phi$$

(2) $$\frac{dy}{dx} = \operatorname{Tan} (\phi + \theta)$$

DIFF. (1)

(3) $$\frac{x \frac{dy}{dx} - y}{x^2} = \operatorname{Sec.}^2 \phi \frac{d\phi}{dx}$$

Substitute (2) in (3) and (1) and (3)

(4) $$\frac{x \operatorname{Tan} (\phi + \theta) - x \operatorname{Tan} \phi}{x^2} = \operatorname{Sec.}^2 \phi \frac{d\phi}{dx}$$

Now $\operatorname{Tan} (\phi + \theta) = \dfrac{\operatorname{Tan} \phi + \operatorname{Tan} \theta}{1 - \operatorname{Tan} \phi \operatorname{Tan} \theta}$ (4a)

Substitute (4a) in (4) and cancel $x$ then:

$$\frac{1}{x} \left( \frac{\operatorname{Tan} \phi + \operatorname{Tan} \theta}{1 - \operatorname{Tan} \phi \operatorname{Tan} \theta} - \operatorname{Tan} \phi \right) = \operatorname{Sec.}^2 \phi \frac{d\phi}{dx}$$

Put all over common denominator and cancel $\operatorname{Tan} \phi$ $$\frac{1}{x} \left( \frac{\cancel{\operatorname{Tan} \phi} + \operatorname{Tan} \theta - \cancel{\operatorname{Tan} \phi} + \operatorname{Tan}^2 \phi \operatorname{Tan} \theta}{1 - \operatorname{Tan} \phi \operatorname{Tan} \theta} \right) = \operatorname{Sec.}^2 \phi \frac{d\phi}{dx}$$

(5) $$\frac{1}{x} \left( \frac{\operatorname{Tan} \theta (1 + \operatorname{Tan}^2 \phi)}{1 - \operatorname{Tan} \phi \operatorname{Tan} \theta} \right) = \operatorname{Sec.}^2 \phi \frac{d\phi}{dx}$$

Now $\operatorname{Sec.}^2 \phi = 1 + \operatorname{Tan}^2 \phi$ (5a)

Substitute (5a) in (5)

$$\frac{1}{x} \left( \frac{\operatorname{Tan} \theta (1 + \operatorname{Tan}^2 \phi)}{1 - \operatorname{Tan} \phi \operatorname{Tan} \theta} \right) = (1 + \operatorname{Tan}^2 \phi) \frac{d\phi}{dx}$$

Rearrange and cancel $(1 + \operatorname{Tan}^2 \phi)$ $$\frac{dx}{x} = \frac{(1 - \operatorname{Tan} \phi \operatorname{Tan} \theta)}{\operatorname{Tan} \theta} d\phi$$

Integrate $$\int \frac{dx}{x} = \left\{ \int \frac{1}{\operatorname{Tan} \theta} - \int \operatorname{Tan} \phi \right\} d\phi$$

(6) $$\log_e (cx) = \frac{\phi}{\operatorname{Tan} \theta} + \log_e \operatorname{Cos} \phi$$

$\operatorname{Tan} \theta$ is a constant and may be something like $\operatorname{Tan} 30$ degrees or $\operatorname{Tan} 35$ degrees etc. i.e., an angle sufficient to cut grass. The rotating blade is assumed to cross the stationary blade everywhere at the grass cutting angle, which in an actual blade may vary along the blade, but here is assumed constant. To find $x$, assume a suitable value for $\theta$ and then substitute various values of $\phi$ in Equation 6 to give corresponding values of $x$. $c$ is a constant of integration and is found by substituting $\phi = 0$ and the chosen value of $\theta$ together with a value of $x$, which is obtained from the design drawing (i.e., $x$ when $\phi = 0$) in Equation 6. Having found a series of values of $x$ for various angles of $\phi$ (say every 10 degrees), (i.e., 10, 20, 30 degrees, etc. $= \phi$) $y$ may be found from Equation 1: $y = x \operatorname{Tan} \phi$.

The curve as obtained from the series of values of $x$ and $y$ is then plotted to give the ideal shape for the cutting edge of the rotating blade. The shape closely approximates to the arc of a circle and to simplify manufacture it may be preferable to form the curve as part of a circle which most closely aproximates to the points plotted from the mathematical computation.

It will, of course, be appreciated that there are a number of advantages which are obtained by using a stone rejecting mechanism and which are as follows:

(1) The blades of the cutter assembly are prevented from coming to a sudden stop with possible damage to the driving mechanism or engine of the lawn mower.

(2) No clutch is required to prevent damage to the driving mechanism or engine.

(3) A stationary blade can be used as part of the cutter assembly and this will give the same finish to the grass as if it were cut with shears. This is an important advantage as known motorised trimming devices do not use stationary blades, and for efficient cutting the cutting blades must rotate at higher speeds than when used with a stationary blade.

(4) The blades hit stones with a glancing blow and therefore suffer less damage than would a straight blade.

It will, of course, be appreciated that various modifications may be made within the scope of the invention. As previously mentioned the curved shape of the cutting edge of the rotating blade may be equally applied to the cutting edge of the fixed blade, or alternatively to the cutting edges of both sets of blades. It is also within the scope of the invention to provide a cutting edge for one or both sets of blades which although not curved in shape closely conforms to such a design, for example the cutting edges may be formed as a series of straight portions each located at an angle to the next adjacent portions, as shown at 17a in FIG. 1. In this latter embodiment the angular position of the outermost straight sections would, in fact, provide the stone rejecting mechanism as previously described.

The invention also covers the possibility of the cutting edge of the rotating blades being separate from the stone rejecting edge of the rotating blades, as shown by the chain dot line 21a in FIGURE 1.

In FIGURE 3 this modification of the blade 12 is shown in section and it will be seen that the front edge 17 of the blade now forms a stone rejecting edge while the cutting edge is shown at 21a, at the rear of a recessed portion 22 of the face of the blade. This arrangement has the important advantage that the stone rejecting edge 17 pushes stones away from the vicinity of the cutting edge of the rotating blades before, during, and after the cutting operation. Thus, the cutting edge suffers much less damage from obstacles than if it were coincident with the stone rejecting edge. The cutting edge is sheltered between the stone rejecting edge and the stationary blade when moving through earth. The separate cutting edge may be straight or curved, the latter being shown by chain dot line 21b in FIGURE 2.

I claim:

1. A grass trimming device comprising at least two elongated blades movable relative to each other about a common point, the leading edge of at least one of said blades being recessed and shaped so as to reject stones outwardly from between it and the leading edge of the other of said blades, the recess separating said one blade into portions of different thicknesses, the rear portion of the edge of said recessed blade engaging in wiping relation with the leading edge of the other blade to shear grass extending between said blades upon the crossing of said blades.

2. A trimming device as in claim 1, wherein said leading edges extend radially outwardly from said point.

3. A trimming device as claimed in claim 1, in which said blades include a stationary blade and at least one rotating blade movable relative thereto.

4. A trimming device as claimed in claim 3, wherein the leading edge of the stationary blade is formed with a straight cutting edge.

5. A trimming device as claimed in claim 4, wherein the stone engaging portion of the rotating blade is formed as a plurality of straight edge portions located at an angle one to the other.

6. A trimming device as claimed in claim 4, wherein the stone engaging portion of the rotating blade is formed as a curve.

7. A trimming device as claimed in claim 4, wherein the cutting portion of the rotating blade is formed as a straight line.

8. A trimming device as claimed in claim 4, wherein the cutting portion of the rotating blade is formed as a curve.

9. A trimming device as claimed in claim 8, wherein the curved cutting portion of the rotating blade crosses the stationary blade at a cutting angle which is of the order of 20 to 40 degrees.

10. A trimming device as claimed in claim 9, wherein the angle between the cutting portion of the rotating blade and the stationary blade increases progressively outwardly of the blades from the initial cross-over point.

References Cited

UNITED STATES PATENTS

| 1,422,901 | 7/1922 | Terry | 30—347 X |
| 1,747,264 | 2/1930 | Rearick | 39—347 X |
| 1,970,827 | 8/1934 | Van Kesteren | 56—256 |
| 2,242,405 | 5/1941 | Sussman | 30—347 X |
| 3,087,298 | 4/1963 | Phillips | 56—295 |

FOREIGN PATENTS 10,179    11/1928    Australia.

WILLIAM FELDMAN, *Primary Examiner.*

J. C. PETERS, *Assistant Examiner.*